No. 611,583. Patented Sept. 27, 1898.
J. TRAVIS, Jr.
COMBINED SOD CUTTER, HARROW, AND SEED PLANTER.
(Application filed Jan. 27, 1896. Renewed Mar. 15, 1898.)
(No Model.) 2 Sheets—Sheet 1.
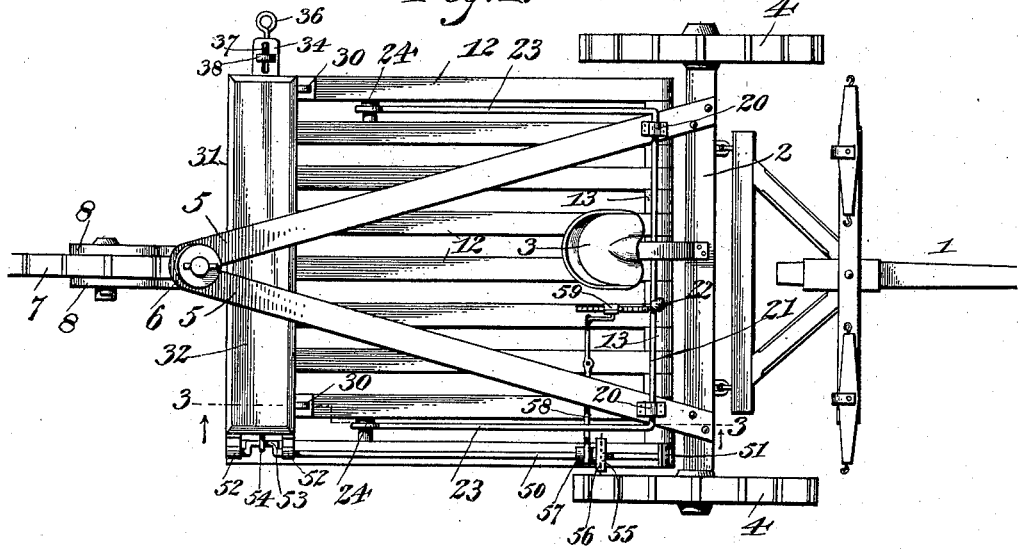
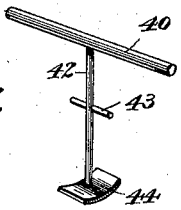
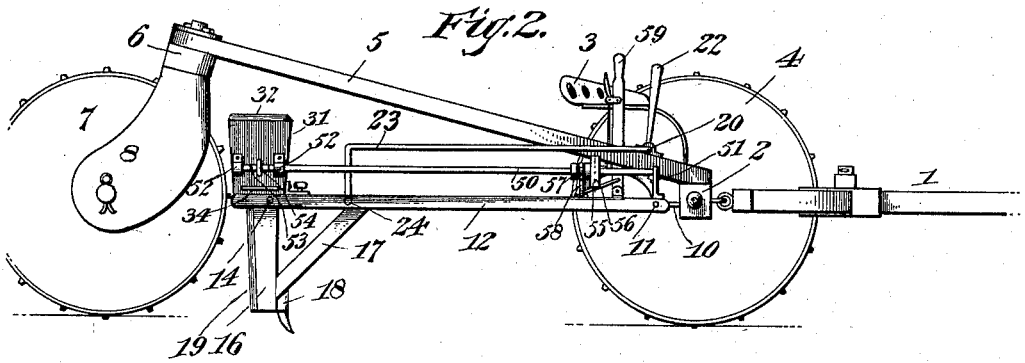

No. 611,583. Patented Sept. 27, 1898.
J. TRAVIS, Jr.
COMBINED SOD CUTTER, HARROW, AND SEED PLANTER.
(Application filed Jan. 27, 1896. Renewed Mar. 15, 1898.)
(No Model.) 2 Sheets—Sheet 2.
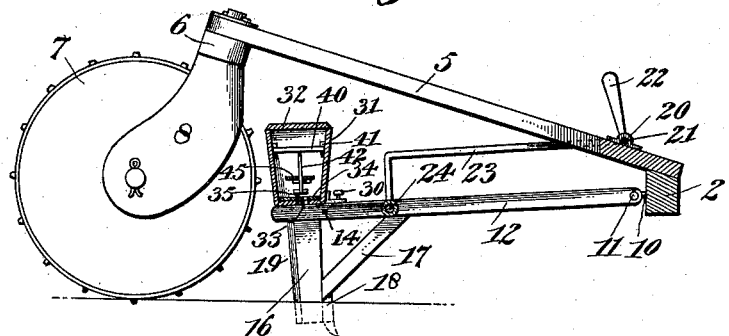
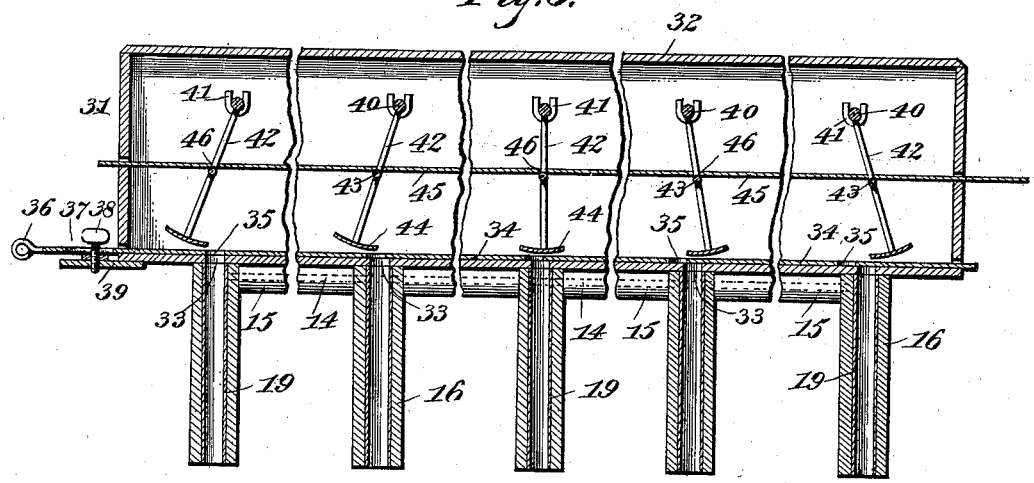
Witnesses:
Inventor:
James Travis, Jr.
by Collamer & Co.,
Attorneys

UNITED STATES PATENT OFFICE.

JAMES TRAVIS, JR., OF CASCADE, MONTANA.

COMBINED SOD-CUTTER, HARROW, AND SEED-PLANTER.

SPECIFICATION forming part of Letters Patent No. 611,583, dated September 27, 1898.

Application filed January 27, 1896. Renewed March 15, 1898. Serial No. 673,979. (No model.)

*To all whom it may concern:*

Be it known that I, JAMES TRAVIS, Jr., a citizen of the United States, and a resident of Cascade, Cascade county, State of Montana, have invented certain new and useful Improvements in a Combined Sod-Cutter, Harrow, and Seed-Planter; and my preferred manner of carrying out the invention is set forth in the following full, clear, and exact description, terminating with claims particularly specifying the novelty.

This invention relates to plows, and more especially to that class of machines thereunder known as "sod-cutters," with which is combined mechanism serving to harrow the ground and, if desired, to plant seed, whereby at one operation the sod can be cut, the land harrowed, and seed planted.

The invention consists in certain details of construction, all as hereinafter more fully described and claimed, and as illustrated in the accompanying drawings, in which—

Figure 1 is a plan view of this machine complete. Fig. 2 is an elevation from the right side with the right-hand main wheel removed. Fig. 3 is a section of the line 3 3 of Fig. 1, showing the knives as considerably depressed. Fig. 4 is a considerably enlarged cross-section of the seedbox and side elevation of one of the knives and drills. Fig. 5 is a longitudinal section of the seedbox, showing different droppers in different positions and different portions of the regulating-plate also in different positions, so as to form various-sized openings from the seedbox into the drill-tubes. Fig. 6 is an enlarged perspective detail of one of the droppers.

*The framework.*—The numeral 1 designates the pole or tongue to which the team of horses is to be hitched, and this tongue is attached to the main axle 2, supporting a seat 3, and carrying at opposite ends the main wheels 4, which preferably have solid wooden bodies with roughened metal tires, as usual. Securely bolted upon opposite ends of the axle 2 are two heavy beams 5, converging to the rear and upward, so as to form a triangle, as seen in Fig. 1, and beneath their rear meeting ends is a heavy block 6. 7 is a caster-wheel trailing in rear of the machine and journaled in a fork 8, which is also journaled through the block 6. This construction of framework I have found very cheap of manufacture, exceedingly light, strong, and durable, capable of being made of angle-iron, metallic tubing, or wood, and providing the strongest form of brace to overcome the jar incident to very rough ground and yet present a bearing for a caster-wheel having a large and strong fork which will not work loose or break, such a common objection in machines of this character.

*The knives.*—Projecting to the rear from the axle 2 are eyebolts 10, in whose eyes is journaled a transverse shaft 11, on which are mounted the front ends of a gang of knife-bars 12, suitably spaced by washers 13. These bars extend to the rear beneath the beams 5 and are connected at their rear ends by another cross-rod 14 and spaced by additional washers 15. From the rear end of each knife-bar 12 depends a tooth 16, rigidly held in place by a diagonal brace 17, and the front side of this tooth carries a vertical knife 18, while in its rear side is the vertical tube 19, forming the drill. Journaled in eyes or bearings 20 on the upper sides of the beams 5 is a cross-shaft 21, having a handle 22 rising therefrom adjacent to the seat 3, and the side arms 23 of this shaft extend to the rear and thence downward and are connected, as at 24, to the gang of knife-bars. A rack-bar may be provided for holding the lever 22 when pressed forward to raise the knives, but I have not illustrated the same, as it is common in the art. When so borne forward, the lever raises the bars so that their teeth will be caused to cut only a trifle into the sod or can be raised completely above the same, if desired, and when the lever is drawn firmly to the rear by the operator the bars carrying the knives will be pressed down, so that they can be made to cut as deep as fourteen inches beneath the sod, the parts of this machine being properly proportioned and constructed.

*The seedbox.*—Removably mounted upon the rear ends of the knife-bars 12 by means of set-screws 30 is a seedbox 31, (best seen in Figs. 4 and 5,) and which box is of any desired size, preferably having its sides converging downwardly and provided with a suitable cover 32, and the bottom of this box is provided with a series of holes 33, as is usual, these holes being of a size to permit the passage of the largest seed and communicating with the upper ends of the tubes 19 in the drills. Just above such bottom is a regulating-plate 34, having holes 35, which, when the plate is adjusted longitudinally of the box, may be moved more or less into or out of register with the holes 33 in the box, so as to permit the dropping of the largest-sized seed or regulate the dropping of smaller-sized seed, as will be clear. Any suitable means may be provided for holding the plate 34 in adjusted position, but in Fig. 5 I have shown this plate as having a handle 36 at the end opposite the delivery mechanism described below, and just inside of the handle the plate is provided with a slot 37, through which takes a set-screw 38 into an ear 39, projecting from this end of the box 30. When this set-screw is loosened, the plate can be set as desired, the slot moving over the body of the screw, and after adjusting the plate the screw is again tightened to hold it in place.

*The agitators or droppers.*—In Fig. 6 is shown one of the agitators or droppers, of which there are several arranged longitudinally within the seedbox, and each dropper consists of a T-shaped body whose cross-bar 40 is journaled at its extremities in sockets 41 in the opposite side walls of the seedbox, whose upright bar 42 preferably has a pin or stud 43 across it and whose lower end carries a curved plate 44, as shown. This plate swings over a hole 33 in the bottom of the seedbox and also over a corresponding hole 35 in the regulating-plate 34, and swinging motion is imparted to the dropper by a narrow plate 45, extending longitudinally of the seedbox and having holes 46, each of which embraces the upright bar 42 of one of the droppers just above the pin 43 therethrough. By this means each dropper, by swinging within the seed in the box, constitutes an agitator and keeps the seed thoroughly stirred, so that it will pass readily through the delivery-openings.

*The operating mechanism.*—50 is a shaft journaled at its front end in a bearing on one knife-bar 12, as at 51, and supported near its rear end in two bearings 52, between which it has a crank 53, connected by a pitman-rod 54 with the narrow plate 45 above described, and which causes the rocking of the droppers. Splined on the shaft 50 is a small wheel 55, having peripheral pins 56, which slightly embed or bear against the inner face of the right-hand driving-wheel 4. On the hub of this spur-wheel is a grooved collar 57, which is embraced by the forked end of a lever 58, and the latter is in turn pivoted upon one knife-bar and controlled by a hand-lever 59 within easy reach of the operator. Hence when the latter manipulates this lever the wheel 55 is moved along the splined shaft 50 nearer to or farther from the hub of the main wheel 4, and by contact with the latter this wheel 55 receives a more or less rapid rotary movement, which is imparted to the shaft 50, whereby the narrow plate 45 is more or less rapidly reciprocated longitudinally of the hopper and the droppers are correspondingly moved.

By withdrawing the set-screws 30 and removing the seedbox, as well as disconnecting the pitman-rod 54 from the crank 53, the entire seed-dropping mechanism can be taken from this machine, and the latter becomes a sod-cutter for unbroken ground or a harrow for broken ground, the depth of the cut being regulated by manipulating the main lever 22. When the seedbox is applied and the proper connections made, the speed of delivery can be regulated by setting the hand-lever 59 so as to cause the wheel 55 to contact with the main wheel 4 at the proper point, and by properly setting the regulating-plate 34 the amount of seed dropped at each movement of the droppers can be regulated to the finest quantity or checked entirely at will. During such dropping of the seed the knives serve the same purpose as when the seedbox was not applied, and hence this machine becomes a combined sod-cutter, harrow, and seed-planter.

All parts are of the desired sizes, shapes, proportions, and materials, and considerable change in or addition to these specific details of construction may be made without departing from the essential principles of my invention.

What is claimed as new is—

1. In a sod-cutter or the like, the combination with an axle having wheels at its opposite extremities, the main framework consisting of two beams bolted upon opposite ends of said axle and converging upward to the rear, a block secured beneath their meeting upper ends, a fork journaled therein, and a caster-wheel carried by the fork; of eyebolts in the rear of the axle, a gang of knife-bars pivotally supported by said eyebolts, knives depending from the rear ends of said bars, and means for raising and lowering the bars at will, as and for the purpose set forth.

2. In a sod-cutter and seed-planter, the combination with an axle having wheels at its opposite extremities, the main framework consisting of two beams bolted upon opposite ends of said axle and converging upward to the rear, a block secured beneath their meeting upper ends, a fork journaled therein, and a caster-wheel carried by the fork; of a gang of knife-bars pivotally supported at their front ends by the axle and having depending knives at their rear ends and seed-drills in rear of the knives, means for raising and lowering said bars at will, a seedbox mounted on the rear end of the gang of knife-bars and extending across the same beneath said main framework, set-screws holding this box removably in place, seed-droppers within the box, and removable connections between said droppers and one of the main wheels, as and for the purpose set forth.

3. In a seed-planter, the combination with the main framework supported on solid wooden wheels, the seedbox having delivery-openings in its bottom, seed-drills below said openings, seed-droppers above said openings, and a plate connecting said droppers and extending beyond one end of the box; of a crank-shaft journaled in bearings just inside and radial of one main wheel, a pitman connecting its crank with said plate, a wheel splined on this shaft and having spurs engaging the inner face of the adjacent main wheel, a grooved hub on this spur-wheel, a fork engaging such groove, and a hand-lever for moving the fork, as and for the purpose set forth.

4. In a seed-planter, the combination with the main framework and drills, and a seed-box carried by the latter and having holes in its bottom communicating therewith; of a number of droppers within the box each consisting of a T-shaped body having the extremities of the cross-bar at its upper end journaled in the sides of the box and having its upright bar provided with a cross-pin at about the center of its length, a plate at its lower end moving over the hole in the box, a narrow plate extending longitudinally of the box and having holes surrounding the upright bars of said droppers just above and resting on their pins, and means for reciprocating this narrow plate from one of the main wheels of the machine, as and for the purpose set forth.

5. In a seed-planter, the combination with the main framework and drills, a hopper carried by the latter and having holes in its bottom communicating therewith, and a number of seed-droppers within the hopper each consisting of a T-shaped body having the extremities of its cross-bar journaled in the sides of the hopper and carrying a narrow plate at its lower end moving over one of the holes in the bottom thereof; of a narrow plate moving longitudinally through the hopper and having holes embracing the bodies of said droppers, a crank-shaft whose crank is connected with said plate, a spur-wheel splined on this shaft with its spurs engaging one of the main wheels of the machine, and a clutch and clutch-lever for adjusting the spur-wheel on said shaft and radially of said main wheel, as and for the purpose set forth.

In testimony whereof I have hereunto subscribed my signature on this, the 18th day of January, A. D. 1896.

JAMES TRAVIS, JR.

Witnesses:
ROBERT FLINN,
WILL D. SHEPHERD.